United States Patent
Pastor et al.

(10) Patent No.: US 10,397,223 B2
(45) Date of Patent: Aug. 27, 2019

(54) METHOD FOR ESTABLISHING AN AUTHORIZED COMMUNICATION BETWEEN A PHYSICAL OBJECT AND A COMMUNICATION DEVICE ENABLING A WRITE ACCESS

(71) Applicant: Alcatel Lucent, Boulogne Billancourt (FR)

(72) Inventors: Alain Pastor, Nozay (FR); Mathieu Beauvais, Nozay (FR)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 14/422,634

(22) PCT Filed: Jul. 5, 2013

(86) PCT No.: PCT/EP2013/064313
§ 371 (c)(1),
(2) Date: Feb. 19, 2015

(87) PCT Pub. No.: WO2014/029546
PCT Pub. Date: Feb. 27, 2014

(65) Prior Publication Data
US 2015/0215320 A1 Jul. 30, 2015

(30) Foreign Application Priority Data
Aug. 20, 2012 (EP) .................................. 12181096

(51) Int. Cl.
*H04L 29/06* (2006.01)
*H04L 29/08* (2006.01)
*H04W 12/08* (2009.01)

(52) U.S. Cl.
CPC .............. *H04L 63/10* (2013.01); *H04L 63/18* (2013.01); *H04L 67/12* (2013.01); *H04L 67/141* (2013.01);
(Continued)

(58) Field of Classification Search
CPC ........... G06F 21/60; G06F 21/62–6227; G06F 21/78–805
See application file for complete search history.

(56) References Cited

U.S. PATENT DOCUMENTS

| 7,946,473 B2 | 5/2011 | Kimura et al. |
| 9,142,122 B2 | 9/2015 | Oshima et al. |

(Continued)

FOREIGN PATENT DOCUMENTS

| CN | 101208973 A | 6/2008 |
| CN | 101309267 A | 11/2008 |

(Continued)

OTHER PUBLICATIONS

Ji Eun Kim et al., "Seamless Integration of Heterogeneous Devices and Access Control in Smart Homes," 2012 Eighth International Conference on Intelligent Environments, IEEE, XP032218223, pp. 206-213, 2012.

(Continued)

*Primary Examiner* — Samson B Lemma
*Assistant Examiner* — Arya Golriz
(74) *Attorney, Agent, or Firm* — Fay Sharpe LLP

(57) ABSTRACT

A method for establishing an authorized communication between a physical object (4, 9, 10) and a communication device (1), wherein said physical object and said communication device comprise both a data processing unit, a contact communication interface (6, 7) and a wide area network interface, the method comprising: —a step of establishing a physical connection between the physical object (4, 9, 10) and the communication device (1) through a contact between the contact communication interfaces (6, 7) of the physical object and the communication device, —a step of transmitting authorization data between the physical object and the communication device through said physical (Continued)

connection to grant access rights over the physical object to the communication using the authorization data, wherein the access rights enable the communication device to make a write access to protected data of the physical object through the wide area network interface of the physical object and the wide area network interface of the communication device.

12 Claims, 2 Drawing Sheets

(52) U.S. Cl.
CPC ......... *H04W 12/08* (2013.01); *H04L 63/0492* (2013.01)

(56) References Cited

U.S. PATENT DOCUMENTS

| | | | |
|---|---|---|---|
| 2004/0227973 A1* | 11/2004 | Taylor | G06F 3/1204 358/1.15 |
| 2007/0211573 A1* | 9/2007 | Hermansson | H04M 1/27451 367/99 |
| 2008/0208925 A1 | 8/2008 | Shum | |
| 2008/0307515 A1* | 12/2008 | Drokov | G06Q 20/32 726/7 |
| 2010/0034386 A1* | 2/2010 | Choong | H04L 9/0894 380/270 |
| 2010/0107238 A1 | 4/2010 | Stedman et al. | |
| 2010/0241807 A1* | 9/2010 | Wu | G06F 17/30233 711/118 |
| 2010/0278345 A1 | 11/2010 | Alsina et al. | |
| 2010/0325735 A1* | 12/2010 | Etchegoyen | G06F 21/121 726/26 |
| 2013/0174273 A1* | 7/2013 | Grab | G06F 21/10 726/28 |

FOREIGN PATENT DOCUMENTS

| | | | | |
|---|---|---|---|---|
| CN | 102461128 A | 5/2012 | | |
| EP | 1096445 A2 * | 5/2001 | ............... | G06F 8/65 |
| EP | 2073183 A1 | 6/2009 | | |
| JP | 2006-165886 | 6/2006 | | |
| WO | WO 2012/070251 | 5/2012 | | |

OTHER PUBLICATIONS

International Search Report for PCT/EP2013/064313 dated Sep. 9, 2013.

* cited by examiner

METHOD FOR ESTABLISHING AN AUTHORIZED COMMUNICATION BETWEEN A PHYSICAL OBJECT AND A COMMUNICATION DEVICE ENABLING A WRITE ACCESS

The present invention relates to the field of interaction between a physical object and a communication device. For instance, the invention relates to the configuration of a communication between the physical object and the communication device through a wide area network.

BACKGROUND

The invention notably relates to the so-called "Web Of Things" which consists in connecting physical objects which may be everyday devices such as communication terminals, televisions, advertising boards, lamps, household appliances which can communicate through the Internet.

One application of this architecture is, for a user, to interact through a communication terminal and through the Internet with the physical objects. Such a terminal may be a personal computer, a notebook, a cellphone such as a "Smartphone".

Such mechanisms are notably described in works concerning the "Web of Things". See for instance, the paper "Towards the Web of Things: Web Mashup for Embedded Devices" by D. Guinard and V. Trifa in Proc. 2nd Workshop on Mashups, Enterprises Mashups and Lightweight Composition on the Web (MEM'09), 2009.

SUMMARY

In an embodiment, the invention provides a method for establishing an authorized communication between a physical object and a communication device, wherein said physical object and said communication device comprise both data processing unit, a contact communication interface and a wide area network interface, the method comprising:
  a step of establishing a physical connection between the physical object and the communication device through a contact between the contact communication interface of the physical object and the contact interface of the communication device,
  a step of transmitting authorization data between the physical object and the communication device through said physical connection to grant access rights over the physical object to the communication using the authorization data,
wherein the access rights enable the communication device to make a write access to protected data of the physical object through the wide area network interface of the physical object and the wide area network interface of the communication device.

According to embodiments, such method can comprise one or more of the features below.

In embodiments of the method, the protected data comprise an extension module, and the access rights enable the communication device to install a software module in the extension module of the physical object through said wide area network interface, the software module being adapted to provide to the physical object a function associated to the hardware capabilities of the physical object.

In embodiments of the method, the method further comprise a step of installing the software module in the extension module, the step of installing the software module comprising a step of identifying a matching software module in a software database.

In embodiments of the method, the method further comprises a step of transmitting a semantic description of the physical object, the identification of the matching software module being made as a function of the semantic description of the physical object.

In embodiments of the method, the semantic description comprises a device identifier identifying the physical object and wherein the step of identifying a matching software module comprises comparing the device identifier with a software module description associated to a software module in the software database.

In embodiments of the method, the software database is included in the communication device.

In embodiments of the method, the device identifier is selected in the group consisting of serial numbers, a model numbers and trademarks.

In embodiments of the method, the method further comprises a step of updating an interface and a semantic description of the physical object as a function of the installed software module.

In embodiments of the method, the method further comprises a step of sending an information from the communication device through a wide area network to the physical object, the information comprising at least a part of the authorization data so as to authenticate the communication terminal.

In embodiments of the method, the authorization data comprise security keys.

In embodiments of the method, the physical object is associated to a virtual object, the virtual object comprising said protected data and a semantic description.

In embodiments of the method, the method further comprises a step of transmitting owner data from the communication device to the physical object, the owner data representing information about the owner of the communication device,
and the access rights are granted by the physical object as a function of the owner data.

In an embodiment, the invention further provides a method for establishing an authorized communication between a physical object and a communication device, wherein said physical object and said communication device comprise both data processing unit, a contact communication interface and a wide area network interface, the method comprising:
  a step of establishing a physical connection between the physical object and the communication device through a contact between the contact communication interface of the physical object and the contact interface of the communication device,
  a step of transmitting authorization data between the physical object and the communication device through said physical connection to grant access rights over the physical object to the communication using the authorization data,
wherein the access rights enable the connection device to trigger a function of the physical object through the wide area network interface.

According to embodiments, such method can comprise one or more of the features below. In embodiments of the method, the physical object comprises a sensor and wherein the function reports data measured by the sensor. In embodiments of the method, the physical object comprises an actuator and wherein the function controls the actuator.

In embodiments of the method, the method further comprises a step of generating a user interface on the communication device, the user interface being adapted to trigger said function in order to control a parameter and/or report data of the physical object.

In embodiments of the method, the method further comprises a step of transmitting to the communication device a semantic description corresponding to the function of the physical object, and the step of generating a user interface on the communication device is made as a function of the semantic description of the function.

In embodiments of the method, the semantic description is transmitted through the contact interfaces. In embodiments of the method, the semantic description is transmitted through the wide area network interfaces of the physical object and the communication device.

In embodiments of the method, the step of generating a user interface further comprises a step of retrieving a user interface element on an interface element database, the generated user interface comprising said user interface element.

In embodiments of the method, the user interface is a graphical user interface or a tangible user interface.

In embodiments of the method, the method further comprises a step of sending an information from the communication device through the wide area network interface to the physical object, the information comprising at least a part of the authorization data so as to authenticate the communication terminal and an instruction to trigger said function.

In embodiments of the method, the authorization data comprise security keys.

In embodiments of the method, the physical object is associated to a virtual object, the virtual object comprising a semantic description.

In embodiments of the method, the method further comprises a step of transmitting owner data from the communication device to the physical object, the owner data representing information about the owner of the communication device,
and the access rights are granted by the physical object as a function of the owner data.

In an embodiment, the invention also provides a computer program comprising computer-executable instructions that perform one of the above-mentioned method when executed.

An idea on which the invention is based is to provide a communication terminal access rights through a physical contact to a physical object, the access rights allowing the communication terminal an access to a protected part of the physical object through a wide area network.

An idea on which the invention is based is to provide a method allowing a communication device to get access rights by a physical contact with a physical object in order to control or monitor a function of the physical object.

Aspects of the invention are based on the idea to provide a method allowing a communication device to get access rights by a physical contact with a physical object in order to install a new function on the physical object.

Aspects of the invention are based on the observation that some services implemented on physical objects may not have the appropriate hardware interface in order to control or monitor the status of the service. For instance, a service which was not expected during the manufacturing phase of the object may be integrated on the physical object e.g. by downloading appropriate software from the network. Therefore, aspects of the invention are based on the idea to generate a user interface for services provided by said physical object on an external communication device so as to allow the user to control and/or monitor the function of the service through the communication device.

Some aspects of the invention are based on the idea to provide communication physical objects that are economical and sustainable for the environment.

Some aspects of the invention are based on the idea to provide to a user an easy way to upgrade automatically the data processing function of control function of a physical object through a physical contact between a communication terminal and a physical object.

BRIEF DESCRIPTION OF THE DRAWINGS

These and other aspects of the invention will be apparent from and elucidated with reference to the embodiments described hereinafter, by way of example, with reference to the drawings.

DETAILED DESCRIPTION OF THE EMBODIMENTS

Figure 1:
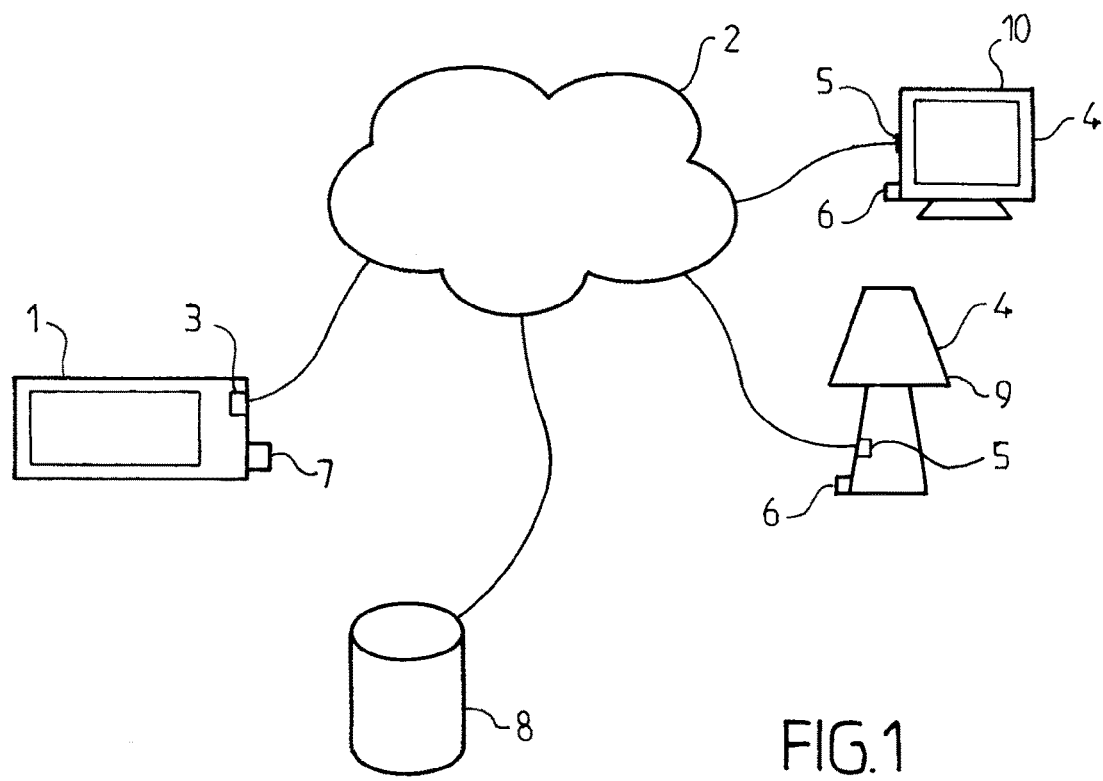
FIG. 1 is a schematic representation of the general architecture of a system in which an embodiment of the invention is implemented.

FIG. 1 illustrates a communication terminal 1 controlled by a user and connected to a communication network 2. More precisely, the communication terminal 1 comprises a network interface 3 which allows it to communicate with the network 2. The communication terminal 1 may be a mobile terminal such as a mobile phone i.e. a smartphone, a stationary personal computer or a notebook. The network interface 3 may be a radio interface, i.e. Wifi, 3G, LTE, etc, or a wired interface. The communication network 2 is generally a composite network that may comprise different kinds of networks e.g. a private wired network, a public network, a radio network etc, that form a part of the Internet.

Several physical objects 4, which are here a lamp 9 and a television set 10, are also connected to the communication network 2. For that purpose, the physical object 4 comprises a network interface 5 connected to the communication network 2. The network interface is part of a data processing unit that may be directly embedded in the lamp 4. Alternatively, an interface device that forms a gateway may be arranged between a plurality of physical objects 4 and the communication network 2. Other physical objects 4 may be connected to the communication network 2.

The physical objects 4 may be of different nature. For instance, the physical objects 4 may be devices such as an advertisement board, a television set, a household appliance, another communication terminal, a fridge, a camera, a media drive, an information display etc. The physical objects 4 may be present in the user's home but also in public environments or other locations, for instance the user's workplace.

Moreover, each physical object 4 may offer a plurality of services via its data processing unit having a network interface. A service is a function offered by a physical object 4 which is available through the "web of things" and therefore may be used or activated through the Web by using the communication terminal 1 or by another physical object 4. For instance, the lamp 9 provides a switch-on/switch-off service that permits the communication terminal 1 to switch on or off the lamp remotely from its communication terminal 1 and through the communication network 2.

These services are accessible to the communication terminal 1 through a virtual object which is a representation and an interface in the network of a corresponding physical object 4. In other words, each virtual object consists in a virtual part of the physical object 4 that comprises a virtual interface through the communication network 2 to associated physical object 4.

The virtual representation comprises an application programming interface (API) and a semantic description. The application programming interface API allows the use of services provided by the associated physical object, for instance by other physical objects 4, a communication terminal 1 or software applications. The semantic description allows to model the behavior of the physical object 4 and notably to interface it with a communication terminal 1 or other physical objects 4 and software applications. Such a virtual object is illustrated by numeral 16 on FIG. 3 and consists in a virtual lamp 16 associated to the lamp 9. The virtual object may be stored in the data processing unit of the physical object itself, in a distant server linked to said associated object through the communication network 2 or may be distributed in the physical object and the distant server. This virtual object may be accessed through the communication network 2 using a gateway.

However, some specific actions that the physical object 4 is able to perform are protected by access restrictions through the communication network 2 and are not accessible to any communication device 1. Such specific actions include for example installing a new service and function on the data processing unit of the physical object 4, or controlling and/or monitoring a function of the physical object 4. In order to be able to perform those actions, the communication device 1 needs to be granted an access to a software part of the physical object 4 which is included in its associated virtual object.

For that purpose, the communication terminal 1 and the physical object 4 both have a contact interface. The contact interfaces are represented in FIG. 1 by numeral 7 for the communication terminal 1 and numeral 6 for the physical objects 4. More precisely, the contact interfaces 6 and 7 are connectors adapted to produce a physical connection between the physical object and the communication terminal 1 through a physical contact between the interfaces 6 and 7. The physical object 4 and the communication terminal 1 can exchange data through this physical connection. Such a physical connection between the communication terminal 1 and the physical object may be similar to the physical connection established between a physical dataport of a first device and a second device which is described in EP2216910 and which allows data exchange.

The establishment of the physical connection between the communication terminal 1 and the physical object 4 grants to the communication terminal 1 an access to the software part of the physical object 4 through the communication network 2. Therefore the physical connection provides to the communication terminal 1 the ability to perform a specific action associated with the physical object 4. In other words, the communication terminal 1 gets an authorization to perform limited access interactions with physical object 4. This granted access may be continuously provided to the communication terminal 1 after a first contact with the physical object 4 even if the communication terminal 1 is separated from the physical object 4. In other embodiments, the access may be granted only during the contact between the communication terminal 1 and the physical object 4.

Figure 2:
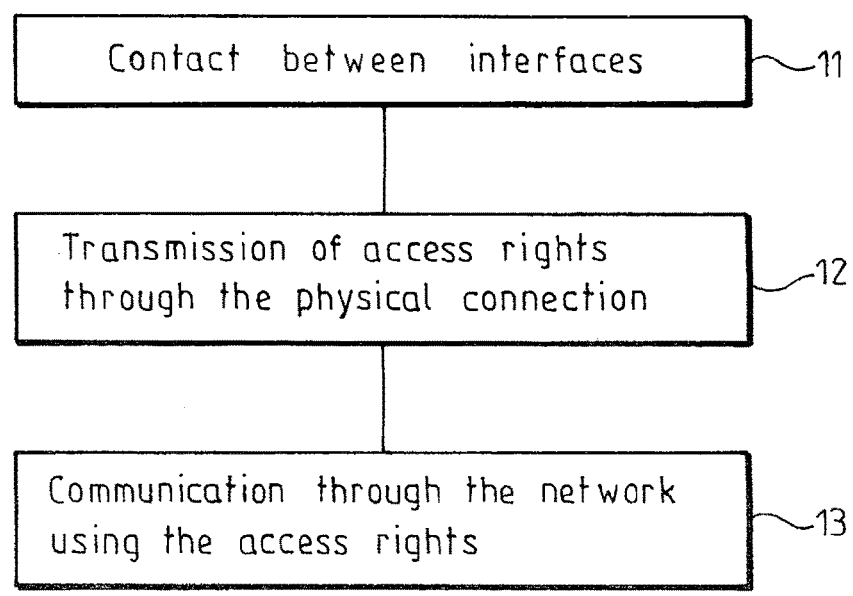
FIG. 2 is a flowchart illustrating steps performed by a communication terminal in order to be able to modify or monitor a software part of a physical object.

The successive steps wherein a communication terminal 1 accesses a software part of a physical object 4 are illustrated in FIG. 2 by a flowchart.

In a first step 11, the user puts the contact interface 7 of its communication terminal 1 in contact with the contact interface 6 of the physical object 4. Therefore, a physical connection allowing data exchange is provided between the data processing unit of the lamp 4 and the communication terminal 1.

Once the physical connection is established, the communication terminal 1 gets the access rights to the physical object 4 software part, in a second step 12. These access rights are provided through a data exchange between the physical object 4 and the communication terminal 1 thanks to the physical connection. More precisely, security keys are transmitted from the physical object 4 to the communication terminal 1 and in the opposite direction.

In a further step 13, the communication terminal 1 interacts with the software part of the physical object through the communication network 2. For that purpose, the communication terminal 1 includes the security key in the data destined to the physical object 4. Thereby, the virtual object associated to the physical object 4 can authenticate the communication terminal 1 as a terminal which is allowed to perform limited access interactions with its corresponding software part. As a consequence, the communication terminal 1 can access the software part of the physical object 4 and therefore, add, modify or read data associated to services and function of the physical object in this protected software part.

In order to better understand the steps illustrated in FIG. 2, a specific example will now be described referring to FIG. 3.

Figure 3:
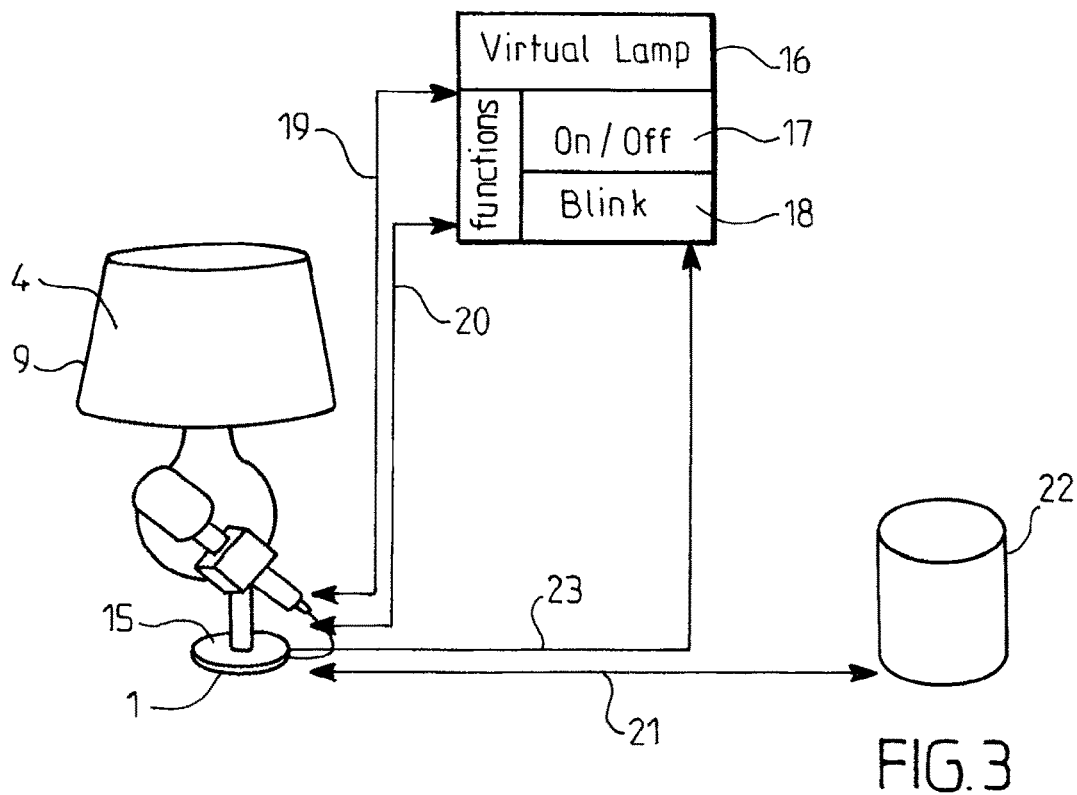
FIG. 3 is a schematic representation of an example of successive steps carried out in order to install a new software module on a physical object.

In FIG. 3, the communication terminal 1 is a disco microphone 15 which is connected to the communication network 2 as is also the lamp 9. The disco microphone 15 comprises a sound processing controller that is able to record and analyze the surrounding sound in order to give instructions to a surrounding physical object 4 as a function of the sound beat. As it is shown on FIG. 2, the lamp comprises a virtual representation, which is indicated on this figure as a Virtual Lamp 16. As indicated above, the Virtual lamp comprises an API allowing the use of functions provided by the Lamp. For instance, the lamp comprises initially the switch-on/switch-off function 17.

However, in order to interact with the lamp 9 so as to make it behave as a function of the sound beat, and in particular to make it blink as a function of the sound beat detected by the disco microphone 15, the user needs to install a new function on the lamp 9.

For that purpose, in a first step, the user takes possession of the disco microphone 15 and put its contact interface 7 in contact with the contact interface 6 of the lamp 9. Therefore, the disco microphone 15 establishes a physical connection with the lamp 9 through the physical contact. This physical connection insures a first secure interaction between the lamp 9 and the disco microphone 15.

In this step represented by arrow 19, the disco microphone and the virtual lamp exchange secret keys. With the secret key received during this exchange, the disco microphone 15 is granted access to an extension module of the virtual lamp 16. This extension module 7 is associated to an information storage that can receive and store software modules that will provide new functionalities to the lamp 9. Indeed, when stored in the extension module, a software module allows the lamp 9 to provide a new service. This new service will be accessible to the disco microphone 15 through the communication network 2. In other words, with the secret key, the disco microphone 15 is granted modification rights allowing it to install a new software module on the virtual lamp 9.

A specific example of a new service that may be implemented in the lamp 9 is a blink service 18. This blink service 18 makes the lamp 9 blink at a specific sequence of "on" and "off". Therefore, a software module may be installed on the extension module of the lamp 15, and provide the blink service on demand. This service allows the lamp 9 to provide new capabilities or functionalities associated to its hardware.

Accordingly, in order to make the lamp 9 behave as a function of the sound beat, the disco microphone 15 installs the blink service 18 in the extension module of the virtual lamp 16. This step is illustrated by arrow 20. For that purpose, the disco microphone 15 retrieves from the virtual lamp 16 the semantic description of the physical lamp 9. The semantic description is a description in XML language that comprises especially an identifier of the lamp 9 such as the model of lamp 9, or its serial number. Furthermore the semantic description may comprise the attributes, state, hardware capabilities, provided services, owner information, type of object and geographical position of the lamp 9. The semantic description may be retrieved from the virtual lamp through the network 2 or through the physical connection.

As it is show by the arrow 21, the disco microphone 15 accesses an external software database 22 comprising software modules. In this step 12, the disco microphone retrieves a compatible software module in the software database 22 according to the serial number and the model of the lamp 9 retrieved in the semantic description of the lamp 4. The software database 22 is accessed through the communication network 2 and may be a database which belongs to the manufacturer of the lamp 9 or third parties. In a variant, the software database may be stored in a data storage included in the disco microphone 15. An appropriate software module may further be retrieved using the hardware description of the lamp or even the description of the functions of the lamp.

In order to find the appropriate software module, an association between a service required by the disco microphone and a description of a software module available in the marketplace must be found. An association between a required service and a software module is found when the corresponding semantic value of a provided service of the software module and the semantic value of the required services present an important semantic correlation.

The semantic values may be an identifier of the required service or complementary keywords. Therefore, the correlation may be computed directly with the identifier of the service or complementary keywords associated to the service. Similarly, the correlation can be based on the identifier of the service provided by the software module or on keywords associated to the provided service. For instance, the association is found when the required service and the provided services present an identical keyword or identifier.

However, other methods may be employed and can take into account the fact that a semantic value may be more generalized than another. For instance, a required service may have a "display picture" semantic value and the application may have a "display photograph" semantic description. Such correlations may be then detected by the user's terminal 1 which then associates the corresponding software module with the corresponding required service. A correlation may also be detected by the user's terminal when two semantic values are synonyms.

It may also be required to make a finer correlation. For that purpose, the computation means of the communication terminal 1 may use an ontology. This ontology may be accessible on the web, or can be local. The ontology may evolve so as to integrate new services, new evolutions and new devices. The use of an ontology allows to correlate similar concepts: for instance a "scintillate" keyword may be correlated with "blink" keyword.

The lamp 9 may provide the access right depending on other criteria. Indeed, the disco microphone 15 may provide through the physical connection information indicating the owner of the disco microphone. The lamp 9 then determines accordingly the sociological proximity between the owner of the lamp 9, which may be for instance indicated in the semantic description of the lamp 9, and the disco microphone 15 owner. According to the sociologic proximity between these owners, the access right may be more or less extensive. For instance if the owner of the lamp 9 is the same than the owner of the disco microphone 15, the disco microphone may get full access to the software part of the lamp. If the owners are different, the access may be limited only to the control and monitor of the function of the lamp 9 and therefore the disco microphone may not be able to install a software module on the lamp.

After retrieving a compatible software module, the disco microphone 15 triggers the installation of the software module on the lamp 9 through the communication network 2, as it is illustrated by arrow 23. The installation of the new software module is made using the communication network 2. During the installation step 13, the software module is stored in the software part of the lamp 9 and a new semantic description of the lamp 9 is generated as well as a new interface, and further possibly a graphical interface (widget) and new access policies concerning the new installed function.

When the software module is installed, the disco microphone is able to trigger the new function blink 18 of the lamp 9 through the communication network 2. Therefore, the disco microphone 15 may be moved to another location such as a baby-room of a friend's house wherein it will be able to monitor the sound ambiance in this location and make the lamp 9 blink accordingly. Moreover, the user is able to use the newly installed function through the communication network 2 and especially through the Web.

The microphone 15 only needs a first contact with the lamp 9 and therefore can then be moved away from the lamp without any effect on the installation of the software module. Indeed, the microphone 15 needs only a short time contact to get the access rights, then the installation is fulfilled though the communication network 2.

In an alternative embodiment, the access rights obtained through a first contact with the lamp 9 are maintained or are lost as a function of the physical proximity between the disco microphone and the lamp 9. For instance, the access rights are maintained in a limited geographical area around the lamp 9. If the disco microphone 15 is placed too far from the lamp 9, the access rights are lost.

In other embodiments, the implementation of a software module and further modifications of the virtual lamp 16 may be fulfilled only when the disco microphone 15 is in contact with the lamp 9. Indeed, valid authorization data are continuously transmitted through the contact between the lamp and the disco microphone. If the user breaks the contact between the disco microphone 15 and the lamp 9, the authorization data stored in the disco microphone 15 will be outdated, and therefore, the disco microphone 15 does not have access rights to the software part of the lamp 9.

Similarly, the installation of a new software module may be restricted to the presence of a physical contact between the microphone and the lamp. In other embodiments, this installation may be authorized even if the microphone is not in contact anymore after a first contact.

Figure 4:
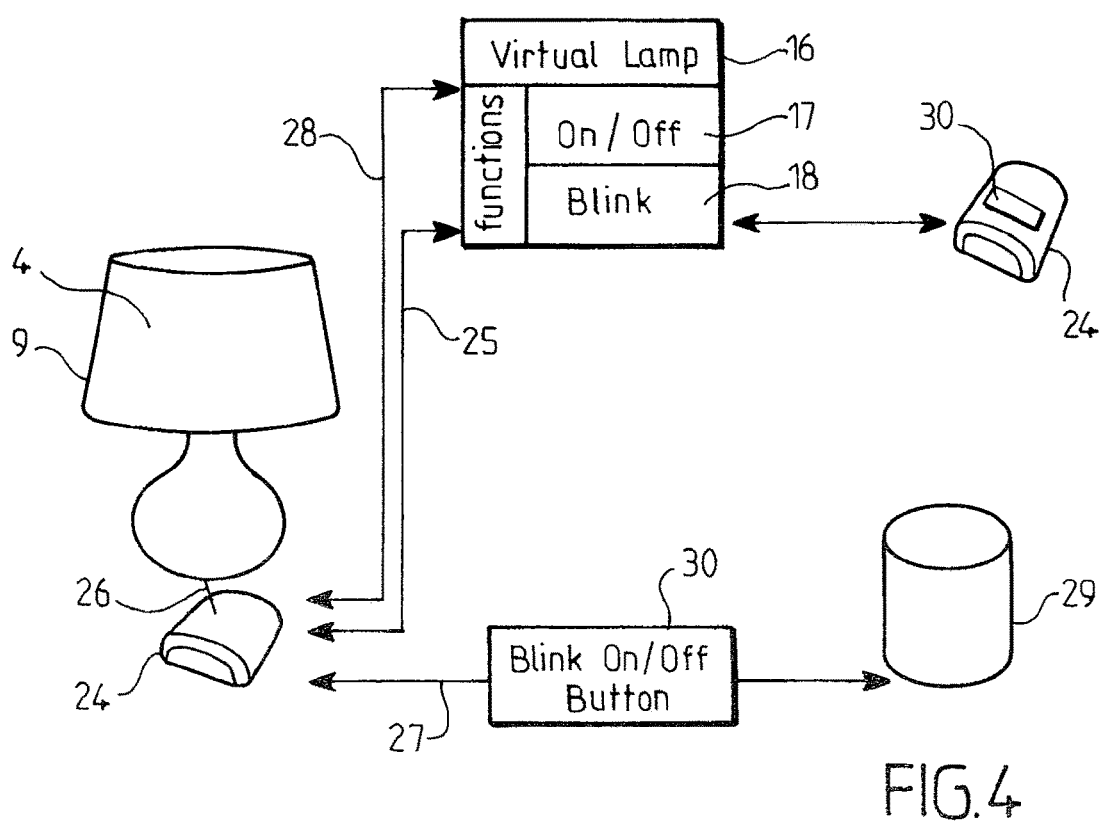
FIG. 4 is a schematic representation of an example of successive steps carried out in order to allow a smartphone to control functions of the physical object.

FIG. 4 illustrates steps subsequent to the installation of the blink function 18 on the lamp 9 described above.

A smartphone 24 presenting a touch-screen is controlled by the user. The user wants to control the the lamp 9 by using the smartphone 24. However, the smartphone 24 is not initially configured to control the data processing unit of the lamp 9. Therefore, the smartphone 24 needs to get access rights in order to control the lamp 9. These access rights are only provided through a contact between the lamp 9 and the smartphone 24.

The lamp 4 comprises a data processing unit offering several functions such as the on/off function 17 allowing the activation or extinction of the lamp, and the blink function 18 making the lamp blink on activation.

In order to be able to use those functions 17 and 18, the smartphone 24 needs to be granted access to the functions provided by the lamp through a physical contact with the contact interface of the lamp 9.

Therefore in a first step 25 the user puts into contact the smartphone 24 with the lamp 4 and more precisely, a physical interface of the smartphone with the physical interface of the lamp as it may be observed on FIG. 3 by the link 26. The smartphone 24 then gets from the lamp 9 access rights through the physical connection.

Therefore, by using these access rights, the smartphone is allowed to use the switch-on/switch-off function 17 and the blink function 18. Similarly to the above mentioned method, the granted rights originate from secret keys exchanged between the smartphone 24 and the lamp 9. In a further step 25, the smartphone 24 then uses the secret keys when transmitting data through the communication network 2 to the virtual lamp 16 so as to authenticate the smartphone 24 as an authorized device to control or monitor the lamp 9.

Using the secret key, the smartphone is able to modify and read the status of the function 17 or 18 or to give instructions so as to execute the functions 17 or 18.

In an embodiment, the smartphone 24 also monitors a power consumption service that indicates the power consumption of the lamp. This service is also provided by the data processing unit of the lamp 9. Therefore, the lamp 9 does not have an appropriate interface to reflect the power consumption value determined by the power consumption service. Therefore, using the security keys, the smartphone 24 has access to the power consumption parameter and can display it to the user.

The smartphone may further have access to other data that may be present in the physical object in order to monitor them. For instance such data may be a usage history which represents the history of the usage of the lamp 9 by remote devices associated with identifiers of the remote devices which used it. Another example is a link history that comprises a list of the remote devices that where in contact with the contact interface 6 of the physical object 4.

A method for installing a control interface in the smartphone 24 will now be described.

Initially, the smartphone 24 does not have an user interface in order to control the functions 17 and 18 of the lamp 9. Therefore, the smartphone will now generate an appropriate graphical user interface in a step 27 subsequent to the receipt of the security keys.

As it is indicated by the arrow 28, beside the access rights provided through the physical connection, the smartphone retrieves the semantic description of the lamp 9 through the physical connection 26 or through the communication network 2. The retrieved semantic description comprises a semantic description of the functions indicating their behavior. For instance, the semantic description indicates that the switch-on/switch-off function needs a Boolean entry, and that the blink function needs a value selected among a plurality of predefined value associated each one to a specific blinking frequency.

On the basis of the semantic description of the function, the smartphone then generates a User Interface language (XUL) description of the graphical user interface. Therefore, the XUL description indicates that the on-off function 17 requires a button graphical representation and the blink function requires a list-box graphical representation.

In a next step 27, the smartphone gets from an interface database 29 appropriate interface artifacts 30 such as a button, a list box or a wheel actuator or other logical representations. This interface database is reached by the smartphone through the communication network 2. However, in some embodiments, the interface database may be integrated in the smartphone 24.

The smartphone 24 then generates the user interface according to the interface artifacts and the XUL description and displays it on the touch screen. Therefore, the user is then able to interact with the touch-screen in order to give instructions to the lamp 9 through the communication network 2, the instruction being transmitted with the security keys so as to authenticate the smartphone 24. More precisely, the instructions are sent to the virtual representation of the lamp 16 and the corresponding API then generates commands understandable by the data processing unit of the lamp according to the instructions of the user.

The user interface is not necessarily generated from a XUL interface. Indeed other kinds of interface descriptions may be generated, for instance by using HyperText Markup Language (HTML). Moreover, the interface artifacts may be graphical in order to be displayed on the screen or may be tangible for the use on a tangible user interface. Such a tangible interface may be a tactile array or a shape display. Tangible interfaces are for instance described in the "Actuation and Tangible User Interfaces: the Vaucanson Duck, Robots, and Shape Displays" by Ivan Poupyrev et al. An embodiment of generating a tangible user interface consists in configuring the shape of a shape display by actuating corresponding actuators of the shape display.

Similarly to the steps described in reference to FIG. 3, the access rights provided to control or monitor functions of a physical object may only be provided during the contact with physical object 4, or may be provided on a period after a first contact with the object.

The physical interface may be a connector or a connection surface.

The invention is not limited to the described embodiments. The appended claims are to be construed as embodying all modification and alternative constructions that may be occurred to one skilled in the art, which fairly fall within the basic teaching here, set forth. The use of the verb "to comprise" or "to include" and its conjugations does not exclude the presence of elements or steps other than those stated in a claim. Furthermore, the use of the article "a" or "an" preceding an element or step does not exclude the presence of a plurality of such elements or steps. The invention may be implemented by means of hardware as well as software. The same item of hardware may represent several "means".

In the claims, any reference signs placed between parentheses shall not be construed as limiting the scope of the claims.

The invention claimed is:

1. A method for establishing an authorized communication between a physical object and a communication device, wherein the physical object and the communication device both comprise a data processing unit, a contact communication interface and a wide area network interface, the method comprising:

establishing a physical connection between the physical object and the communication device through the contact communication interface of the physical object and the contact interface of the communication device, transmitting authorization data between the physical object and the communication device through the physical connection to grant access rights over the physical object to the communication device using the authorization data, wherein the access rights enable the communication device to make a write access to protected data of the physical object through the wide area network interface of the physical object and the wide area network interface of the communication device, wherein the protected data comprise an extension module, and wherein the access rights enable the communication device to install a software module in the extension module of the physical object through the wide area network interface, the software module being adapted to provide to the physical object a function associated with hardware capabilities of the physical object, wherein the method further comprises transmitting the software module from the communication device to the physical object to be installed in the extension module, wherein, in order to install the software module, the communication device identifies a matching software module in a software database.

2. The method according to claim 1, wherein the method further comprises receiving at the communication device a semantic description of the physical object, the identification of the matching software module being made as a function of the semantic description of the physical object.

3. The method according to claim 2, wherein the semantic description comprises a device identifier identifying the physical object and wherein the identifying a matching software module comprises comparing the device identifier with a software module description associated to a software module in the software database.

4. The method according to claim 3 wherein the software database is included in the communication device.

5. The method according to claim 3, wherein the device identifier is selected in the group consisting of serial numbers, a model numbers and trademarks.

6. The method according to claim 1, wherein the method further comprises updating an interface and a semantic description of the physical object as a function of the installed software module.

7. The method according to claim 1, wherein the method further comprises sending an information from the communication device through a wide area network to the physical object, the information comprising at least a part of the authorization data so as to authenticate the communication terminal.

8. The method according to claim 1, wherein the authorization data comprise security keys.

9. The method according to claim 1, wherein the physical object is associated to a virtual object, the virtual object comprising the protected data and a semantic description.

10. The method according to claim 1, wherein the method further comprises transmitting owner data from the communication device to the physical object, the owner data representing information about the owner of the communication device, and wherein the access rights are granted by the physical object as a function of the owner data.

11. A non-transitory computer readable medium comprising instructions comprising computer-executable instructions that perform a method for establishing an authorized communication between a physical object and a communication device, wherein the physical object and the communication device comprise both a data processing unit, a contact communication interface and a wide area network interface, the method comprising:

identifying a physical connection between the physical object and the communication device through the contact communication interface of the physical object and the contact interface of the communication device, transmitting authorization data between the physical object and the communication device through the physical connection to grant access rights over the physical object to the communication device using the authorization data, wherein the access rights enable the communication device to make a write access to protected data of the physical object through the wide area network interface of the physical object and the wide area network interface of the communication device, wherein the protected data comprise an extension module, and wherein the access rights enable the communication device to install a software module in the extension module of the physical object through the wide area network interface, the software module being adapted to provide to the physical object a function associated with hardware capabilities of the physical object, wherein the method further comprises transmitting the software module from the communication device to the physical object to be installed in the extension module, wherein, in order to install the software module, the communication device identifies a matching software module in a software database.

12. The method according to claim 1, wherein the access rights between the communication device and the physical object are maintained or are lost as a function of the physical proximity between the communication device and the physical object.

* * * * *